May 29, 1951  R. W. TUTHILL  2,555,017
ELECTRODE HOLDER FOR GAS BLANKETED
ELECTRIC ARC WELDINGS
Filed Aug. 18, 1949
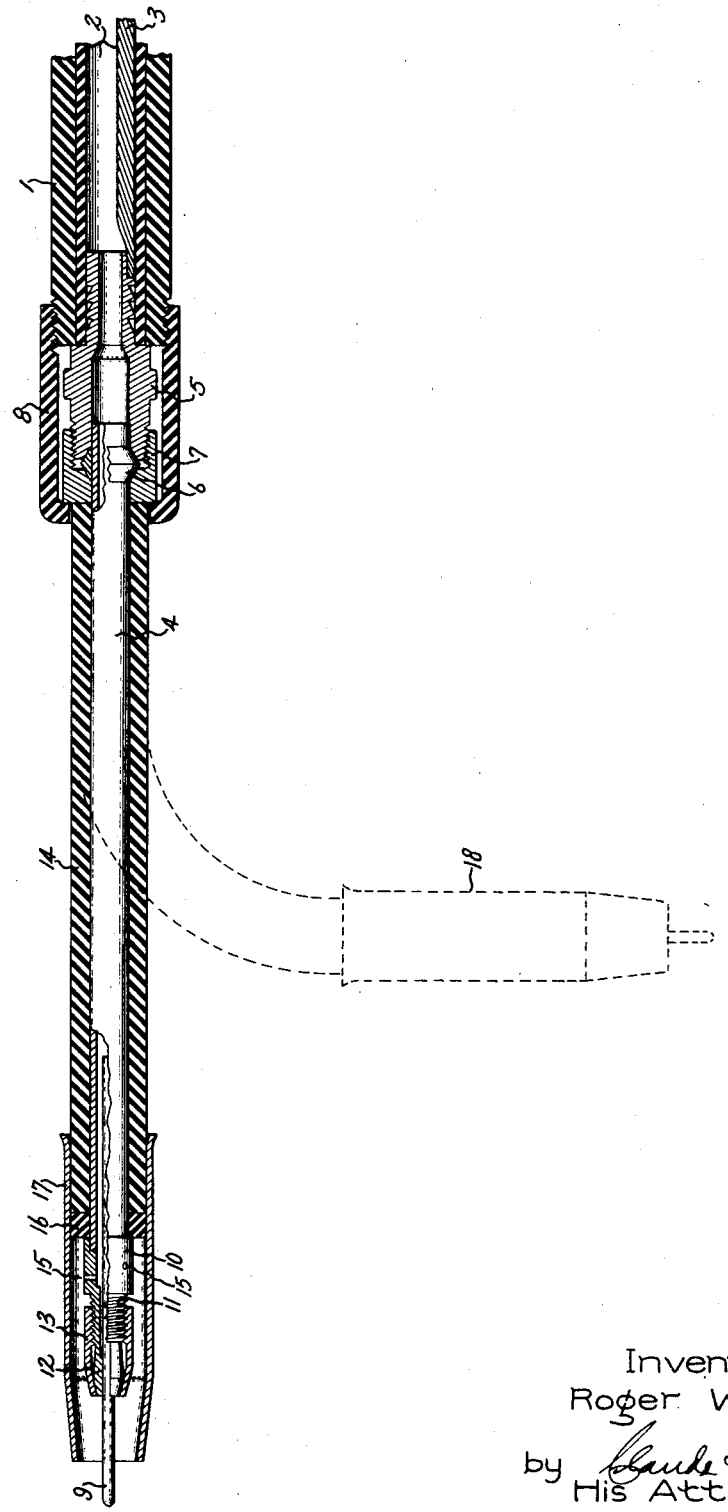
Inventor:
Roger W. Tuthill,
by [signature]
His Attorney.

Patented May 29, 1951

2,555,017

UNITED STATES PATENT OFFICE 2,555,017

ELECTRODE HOLDER FOR GAS BLANKETED ELECTRIC ARC WELDINGS

Roger W. Tuthill, West Springfield, Mass., assignor to General Electric Company, a corporation of New York Application August 18, 1949, Serial No. 110,968

1 Claim. (Cl. 219—14)

My invention relates to welding apparatus and more particularly to electrode holders adapted for use in gas blanketed electric arc welding.

In many industrial processes such as in the manufacture or repair of surgical equipment or jewelry, it is often desired to fasten two relatively thin or small metal parts together with a clean smooth juncture. Because accessibility for resistance spot welding may be lacking, it is often desirable in such applications to join the parts for fusion using a welding process which does not require a solid flux since such solid flux, if not completely removed from the joint after a brazing or other welding operation, may produce with certain metals a subsequent corrosion which is intolerable. A gas blanketed arc welding process, commonly referred to as "inert-arc" welding is suitable for this purpose. In inert-arc welding, an electric arc, formed between the work and a relatively non-consumable electrode, is surrounded by a blanket of inert monatomic gas, such as argon or helium, in order to prevent oxidation and other contamination and thereby eliminate the use of a solid flux. The pool of fused metal formed by the intense heat of the arc solidifies to form a weld surface which is smooth, clean and without spatter.

Inert arc welding electrode holders which have heretofore been devised have been relatively large and of rigid and complicated structure due to the means employed for electrically insulating the current and gas conducting parts of the holder from the operator and for providing an electrically insulated support for a gas discharge directing nozzle. As a result, such inert-arc welding torches are too unwieldy and cumbersome for delicate welding work, such as mentioned above.

Accordingly, it is a principal object of my invention to provide an electrode holder for use in gas blanketed electric arc welding which is compact, flexible, light-weight and easily manipulatable, and therefore well suited for extremely delicate welding work.

Another object of my invention is to provide an inert arc welding tool which has a simple economical construction and which is deformable to that shape which is most conveniently manipulated when welding different types of joints.

In general, my improved electrode holder comprises an internal flexible, non-resilient tubular member functioning both as a gas and an electricity conductor and encircled by an electrically insulating sheath composed of resilient heat resistant material, such as silicone rubber. Electrode gripping means are secured to the gas outlet end of the tubular member and a gas discharge directing nozzle adheres to the end of the insulating sheath in a manner to surround the electrode. This resilient heat resistant sheath serves many purposes. It provides a flexible insulation to protect the operator from the danger of an electrical shock, functions as a simple nozzle retaining means and acts as a gas seal to prevent an escape of gas through the rear of the nozzle.

The novel features which I believe to be characteristic of my invention are set forth with particularity in the appended claim. My invention itself, however, together with further objects and advantages thereof can best be understood by reference to the following description taken in connection with the accompanying drawing in which the sole figure is a side view, partly in section, of an electrode holder embodying my invention.

Referring to the figure, I have shown my invention in one form as comprising an insulating handle 1 containing a gas conduit 2 in which an electric current carrying cable 3 is inserted. The cable 3 is secured to the gas receiving end of a deformable electrically conductive tubular member 4, preferably metallic, such as a copper tubing, by an electrically conductive and gas-tight coupling assembly comprising a threaded collar 5, a bilaterally tapered sealing ring 6 and a compressing nut 7 arranged to be screwed on collar 5. This coupling assembly is surrounded by a handle end portion 8 which is preferably detachable in order to provide a ready access to the coupling nut 7. The tubular member 4 functions to supply both gas and electricity to the welding tip.

Electrode gripping means are also provided in order to retain a welding electrode 9 in a position axially extending from within the gas discharging end of the tubular member 4. As illustrated in the drawing, this electrode gripping means may comprise a collet 10 secured to the tubular member 4 by such means as brazing and having a threaded end portion 11 and a plurality of gripping tongs 12 axially extending beyond the threaded end portion 11. A tapered collet gripping nut 13 is threaded to the collet and functions in a well-known manner to constrict the tongs 12 tightly around the electrode 9.

The tubular member 4 is encased in a flexible sheath 14 composed of an electrically insulating and resilient heat resistant material, such as polytetrafluoroethylene, polymonochlorotrifluoroethylene, or silicone rubber, which are able to withstand the high temperatures occurring during the welding process without melting or chemical decomposition. In order to produce a gas blanket around the welding electrode, a plurality of gas outlets 15 are formed in the body of the collet 10. It is apparent that the gas outlets 15 may alternatively be located in the gas discharge end portion of the tubular member 4.

The flexible sheath 14 extends axially to a point adjacent the gas outlets 15 and a protective insulating heat resistant washer 16, preferably composed of a fibre glass fabric melanine resin bonded material, is interposed between the collet 10 and the end of sheath 14. A gas discharge directing nozzle 17, which is preferably metallic, but may be ceramic, is arranged to be inserted over the washer 16 and the end of the sheath 14. Due to the resilient nature of the sheath 14, the nozzle 17 adheres to the sheath 14 with close frictional engagement. It will be appreciated that the nozzle 17 may be easily detached by merely pulling it away from the sheath 14 with the result that the electrode 9 may then be easily and rapidly replaced.

In the operation of my invention an inert gas is supplied through the gas conduit 2 and electricity is supplied through the cable 3 to the tubular member 4 which functions to carry electricity through the electrode gripping means to the electrode 9 and to supply gas through the gas outlets 15 to the gas discharge directing nozzle 17. This nozzle 17 forms a gas shield or blanket around an electric arc struck between the electrode 9 and the work.

It will be appreciated that due to the deformable tubular member 4 and the resilient sheath 14, the front portion of the electrode holder may be bent in any direction, as indicated by the dashed lines 18, in order to enable the tool to be adapted for comfortable use on different types of joints in various work assemblies. In addition, because of the many purposes served by the sheath 14, a very compact electrode holder of simple and economical construction is produced.

It is to be understood that while I have shown a particular embodiment of my invention many modifications can be made, and I therefore intend by the appended claim to cover all such modifications as fall within the true spirit and scope of my invention.

What I claim as new and desire to secure by Letters Patent of the United States is:

An electrode holder adapted for use in gas blanketed electric arc welding comprising an insulating handle, gas and electric conduits within said handle, a flexible non-resilient metal tubing connected at one end to receive gas and electricity from said gas and electric conduits, said tubing having at least one gas outlet formed in the opposite end thereof, a silicone rubber sheath encasing said tubing and terminating at a point adjacent said gas outlet end thereof, electric conducting electrode gripping means secured to said tubing for retaining a welding electrode axially extending from within said gas outlet end of said tubing, and a gas discharge directing nozzle encircling said terminating portion of said sheath in close frictional engagement therewith and axially extending to surround a retained electrode in spaced relation thereto, said silicone rubber sheath constituting a deformable protective covering and electric insulation for said metal tubing, and also constituting an axially aligning easily detachable mounting for said nozzle as well as a heat resistant gas seal at the rear of said nozzle.

ROGER W. TUTHILL.

REFERENCES CITED

The following references are of record in the file of this patent:

UNITED STATES PATENTS

| Number | Name | Date |
|---|---|---|
| 1,953,915 | Burgett et al. | Apr. 3, 1934 |
| 2,133,371 | Ballard | Oct. 18, 1938 |
| 2,314,628 | Pavlecka | Mar. 23, 1943 |
| 2,402,937 | Stringham | June 25, 1946 |
| 2,444,767 | Cobean | July 6, 1948 |
| 2,445,863 | Sarazin | July 27, 1948 |